UNITED STATES PATENT OFFICE.

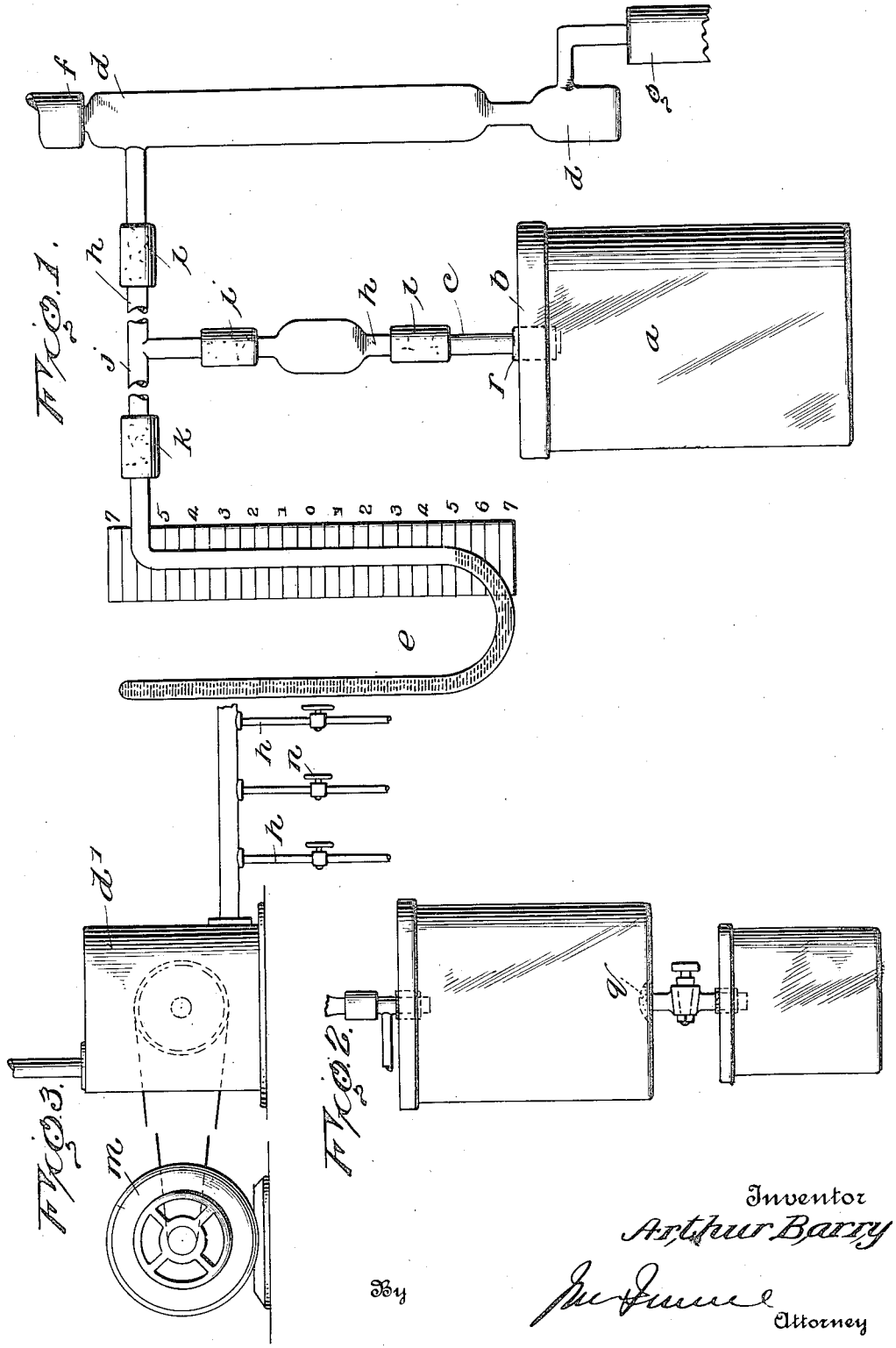

ARTHUR BARRY, OF LIVERPOOL, ENGLAND.

PROCESS OF EXHAUSTING AIR FROM THE PRESENCE OF FOOD PRODUCTS.

1,285,552.     Specification of Letters Patent.    Patented Nov. 19, 1918.

Application filed January 3, 1918. Serial No. 210,190.

*To all whom it may concern:*

Be it known that I, ARTHUR BARRY, a subject of the King of England, residing at Liverpool, in the county of Lancaster, England, have invented new and useful Improvements in and Connected with the Process of Exhausting Air from the Presence of Food Products, of which the following is a specification.

The present invention relates to a process of exhausting air from the presence of food products containing solid and liquid portions.

The invention will be further described with the aid of the accompanying diagrammatic drawings, which illustrate it.

Figure 1 illustrates an arrangement of apparatus adapted to produce a form of apparatus which may be used for extracting the air from the bottle, jar, or vessel containing the goods; and Figs. 2 and 3 show modified forms of the apparatus.

Referring to the drawings, and more particularly to Fig. 1, $a$ represents the bottle, jar, or vessel for containing the edibles, and $b$ is the cover or stopper, $c$ is a short length of pipe of glass, lead or other suitable material in the cover or stopper, which is connected to the air extracting apparatus, and which, when the exhausting operation is complete is closed, either by fusing it by a blow pipe or heat, or solder, or when of metal or flexible material, pinching it and turning over the end on itself. $d$ is the aspirator or air extracting pump, and $e$ is the manometer, with a scale of pressures upon it.

When the short tube $c$ is of metal, the final closing of it may be effected by soldering or equivalent sealing means; and this latter form or means for sealing of the jars, bottles, or vessels is the more suitable for factory work; while the former mode of operating and the means employed is more suitable for domestic purposes.

The pump or aspirator $d$ is fed with motor water supplied through an india-rubber or other pipe $f$, fitting on its upper end, the water and extracted air being carried away below through the pipe $g$; and the pump is connected to the pipe $c$ by means of pipes $h$, which are connected together by rubber couplings $i$. The pump is also connected with the manometer by the pipe $j$, which is attached to the manometer by a rubber coupling $k$.

As stated, the vacuum is created in the vessel $a$, after its cover has been placed in position on it, and secured, the extraction of air being very rapid, therefore, occupying very little time, and enabling a large quantity of edible matters to be treated in a very short time. When the vacuum has been created, the pressure on the cover or stopper tends to make a fluid tight joint between the stopper and the body of the vessel, between which in many cases, an india-rubber or like ring will be used.

By this apparatus, and an aspirator such as shown, which is of well-known type, the high degree of exhaustion required is easily attained, which say may be between 29" and 30" of mercury.

The tube $c$ will be made air tight joint in the cover or stopper $b$ by soldering, or by a rubber $r$ inserted between it and the edge of a hole in the cover $b$.

In the case of treating edibles in tins, after the goods have been inserted, the covers or lids may be fixed to the bodies by seaming or soldering or in any known way; and when the short piece of metal tube, as $c$, has been secured in the lid, or one end, the vessel exhausted, and the tube melted and sealed near the surface of the cover or end, or soldered.

Referring now to Fig. 2, in this case there are two vacuum vessels, an upper vessel $a$, and a lower vessel $a^1$, and the bottom of the upper vessel is secured to the lower vessel $a^1$ by a pipe $o$, having a tap $p$ upon it.

This type of apparatus is especially applicable where it is desired to remove juices from fruit (or other edibles) from the more solid portions, whether the fruit be whole or pulped. Namely, in this case the matter to be treated is introduced into the vessel $a$, and any juice flowing from it will gravitate down through the strainer $q$ in the bottom of $a$, into the vessel $a^1$, which will be put in communication with the upper one by the tap $p$ at the desired time; and the exhausting and sealing of the treating vessels will be effected in the same way as above described.

It is to be noted that this invention can be applied to foods in the ordinary sized bottles or vases such as are used in private houses, or in vessels of large size adapted to hold edibles in bulk or relatively large quantities.

In the latter case, when it is desired to remove some of the substance, this can be done by unsealing the cover or stopper of the vessel $a$ or the vessel $a^1$, and taking out the required quantity of the edible, and then placing the covers or stoppers, and reëxhausting and sealing as before.

Fig. 3 illustrates diagrammatically an operating plant consisting of an electric motor $m$, and a mechanical vacuum pump $d^1$ instead of a hydraulic aspirator or Sprengel type of vacuum pump; and the pump has upon it a plurality of pipes $h$ with controlling cocks $n$ upon them, so that a plurality of vacuum vessels may be operated at the one time.

What is claimed is:—

1. The herein described process of exhausting air from the presence of food products containing solid and liquid portions, which consists in placing the same within a restricted space, withdrawing the liquid portion from the solid portion and introducing said liquid portion into a separate restricted space, simultaneously exhausting the air from the solid and liquid portions within the restricted spaces, and sealing the restricted spaces.

2. The herein described process of exhausting air from the presence of food products containing solid and liquid portions, which consists in placing the same within a restricted space, withdrawing by gravity the liquid portion and introducing the same into a lower restricted space, simultaneously withdrawing the air from said spaces, and sealing the spaces.

3. In apparatus for exhausting air from the presence of food products, an upper container, a removable lid to close the upper end thereof, a lower container arranged directly beneath the upper container, a removable lid to cover the upper end of the lower container, a pipe connecting the lower end of the upper container and the upper end of the lower container, a valve connected in the pipe, and means connected with the lid of the upper container to exhaust air therefrom.

In testimony whereof I have signed my name to this specification in the presence of two subscribing witnesses.

ARTHUR BARRY.

Witnesses:
SOMERVILLE GOODALL,
NELSON GUY.